(12) United States Patent
Sasano

(10) Patent No.: US 8,285,472 B2
(45) Date of Patent: Oct. 9, 2012

(54) APPARATUS AND PROGRAM FOR NAVIGATION

(75) Inventor: Takanori Sasano, Nishikamo-gun (JP)

(73) Assignee: DENSO CORPORATION, Kariya (JP)

( * ) Notice: Subject to any disclaimer, the term of this patent is extended or adjusted under 35 U.S.C. 154(b) by 1088 days.

(21) Appl. No.: 12/153,533

(22) Filed: May 20, 2008

(65) Prior Publication Data

US 2008/0294330 A1 Nov. 27, 2008

(30) Foreign Application Priority Data

May 23, 2007 (JP) .................................. 2007-136596
Apr. 25, 2008 (JP) .................................. 2008-115117

(51) Int. Cl.
*G06G 7/76* (2006.01)
*G08G 1/137* (2006.01)

(52) U.S. Cl. .................................. 701/117; 340/995.19

(58) Field of Classification Search .................. 701/117, 701/118, 119, 410, 411, 414, 416, 428, 429, 701/431, 432, 438, 439; 455/457; 340/990, 340/995.1, 995.11, 995.12, 995.13, 995.19, 340/995.2, 995.26, 995.27
See application file for complete search history.

(56) References Cited

U.S. PATENT DOCUMENTS

| | | | |
|---|---|---|---|
| 6,751,550 B2 | 6/2004 | Niitsuma | |
| 7,739,029 B2 * | 6/2010 | Ishikawa et al. | 701/117 |
| 7,877,206 B2 * | 1/2011 | Cabral et al. | 701/209 |
| 2004/0204845 A1 * | 10/2004 | Wong | 701/210 |
| 2006/0220924 A1 * | 10/2006 | Sera | 340/995.1 |
| 2008/0040031 A1 * | 2/2008 | Tu | 701/209 |
| 2008/0136784 A1 * | 6/2008 | Neoh et al. | 345/173 |
| 2009/0018759 A1 * | 1/2009 | Endo et al. | 701/117 |
| 2009/0118995 A1 * | 5/2009 | Zhao et al. | 701/117 |
| 2010/0010730 A1 * | 1/2010 | Rozum et al. | 701/117 |

FOREIGN PATENT DOCUMENTS

| | | |
|---|---|---|
| JP | A-H09-44791 | 2/1997 |
| JP | A-10-227653 | 8/1998 |
| JP | 10-281786 | * 10/1998 |
| JP | A-H10-281786 | 10/1998 |
| JP | A-H11-037784 | 2/1999 |
| JP | A-11-325941 | 11/1999 |
| JP | A-2001-349735 | 12/2001 |
| JP | A-2003-172628 | 6/2003 |
| JP | A-2004-28825 | 1/2004 |

(Continued)

OTHER PUBLICATIONS

Office Action dated Nov. 16, 2009 from the Korean Patent Office in the corresponding patent application No. 10-2008-0047923 (and English Translation).

(Continued)

*Primary Examiner* — Mark Beauchaine
(74) *Attorney, Agent, or Firm* — Posz Law Group, PLC

(57) ABSTRACT

A navigation apparatus acquires a traffic event and accordingly determines whether or not to change a guiding route to a destination. Based on an affirmative determination, the navigation apparatus displays icons corresponding to traffic events causing the affirmative determination near a road containing the traffic event in a map image in a representation mode for an image of the traffic event different from a normal representation mode assigned to the traffic event. In this manner, the navigation apparatus changes the guiding route to the destination dynamically depending on information about traffic events on roads and allows a user to recognize a cause of changing the guiding route.

16 Claims, 8 Drawing Sheets

FOREIGN PATENT DOCUMENTS

| | | |
|---|---|---|
| JP | A-2005-010168 | 1/2005 |
| JP | A-2005-091249 | 4/2005 |
| JP | A-2006-215189 | 8/2006 |
| JP | A-2007-78544 | 3/2007 |
| JP | A-2007-078544 | 3/2007 |

OTHER PUBLICATIONS

Office Action dated Jun. 16, 2009 from the Japan Patent Office in the corresponding JP Application No. 2008-115117 (and English Translation).

Office Action dated Jul. 21, 2010 from the Korean Patent Office in the corresponding patent application No. 10-2008-0047923 (and English Translation).

Office Action dated Oct. 28, 2010 from the Chinese Patent Office in the corresponding patent application No. 200810109191.X (and English Translation).

Second Office Action issued Oct. 19, 2011 in the corresponding CN patent application No. 2008 1010 9191.X (and English Translation).

* cited by examiner

| EVENT | SPECIAL AVOIDANCE, NORMAL AVOIDANCE |
|---|---|
| EVENT 1 | NORMAL AVOIDANCE |
| EVENT 2 | NORMAL AVOIDANCE |
| ... | ... |

| EVENT | SPECIAL AVOIDANCE, NORMAL AVOIDANCE |
|---|---|
| EVENT 1 | SPECIAL AVOIDANCE |
| EVENT 2 | NORMAL AVOIDANCE |
| ... | ... |

APPARATUS AND PROGRAM FOR NAVIGATION

CROSS REFERENCE TO RELATED APPLICATION

The present application is based on and claims the benefit of priority of Japanese Patent Application No. 2007-136596 filed on May 23, 2007 and Japanese Patent Application No. 2008-115117 filed on Apr. 25, 2008, the disclosure of which is incorporated herein by reference.

FIELD OF THE INVENTION

The present invention relates to a navigation apparatus and a program for the navigation apparatus.

BACKGROUND OF THE INVENTION

According to a known technology, a navigation apparatus for computing and displaying an appropriate guiding route to a destination successively acquires traffic information about roads such as congestion, accident, and highway regulation using VICS (Vehicle Information Communications System in Japan), RDS-TMC and the like. The navigation apparatus dynamically changes the guiding route to the destination in accordance with the acquired information.

According to the above-mentioned technology, the navigation apparatus described in a Japanese Patent Document JP-A-H11-37784 responds to a change in the guiding route and uses a screen to simultaneously display both the old guiding route before the change and a new guiding route after the change. By using such technology, a user can clearly understand a change from the old guiding route to the new one.

Using the technology described in the above patent document (JP-A-H11-37784), however, the user cannot comprehend the reason for the change from the old guiding route to the new one. The present invention has been made in consideration of the foregoing. It is therefore an object of the present invention to provide a navigation apparatus that dynamically changes a guiding route to a destination in accordance with information about traffic events on roads and allows a user to comprehend a reason for changing the guiding route.

SUMMARY OF THE INVENTION

For achieving the above-mentioned object, a navigation apparatus of the present invention allows an image display unit to display a guiding route determined by a route cost calculation and sequentially acquires traffic events on a road. The navigation apparatus controls the image display unit so as to display a traffic event image representing the acquired traffic event near a road containing the traffic event in a map image in a normal representation mode assigned to the traffic event image. The navigation apparatus takes the acquired traffic event into the route cost calculation and, based on a result of the route cost calculation, determines whether or not the guiding route to a destination can be changed. Based on an affirmative determination, the navigation apparatus controls the image display unit so as to display a traffic event image corresponding to the traffic event causing the affirmative determination near a road containing the traffic event in the map image in a first another representation mode for the traffic event image different from the normal representation mode originally assigned to the traffic event image.

The above-mentioned operation displays the traffic event image for the traffic event causing the guiding route to be changed in the first another representation mode different from the normal representation mode assigned to the traffic event image. Attention is drawn to the image of the traffic event that caused the change. As a result, a user can easily recognize the cause of the change of the guiding route.

The "normal representation mode" in this context may be applicable to any representation mode pre-assigned to a traffic event image. Representation mode examples include specific coloring with and without blinking and the like.

Since the navigation apparatus displays a traffic event on the guiding route before route change, the user can view the display and understand how the guiding route is changed. Therefore, according to the present invention, the navigation apparatus can notify the user how the guiding route is changed regardless of the guiding route before route change (i.e., the pre-change guiding route) being displayed or not together with the guiding route after route change.

Further, the navigation apparatus of the present invention allows an image display unit to display guiding routes and determines a guiding route using route cost calculation. The navigation apparatus sequentially acquires traffic events on roads. The navigation apparatus controls the image display unit so as to display a traffic event image representing the acquired traffic event near a road containing the traffic event in a map image. The navigation apparatus takes a cost for the acquired traffic event into the route cost calculation. Based on a result from the route cost calculation, the navigation apparatus determines whether or not to change the guiding route. Based on an affirmative determination, the navigation apparatus changes the guiding route using the route cost calculation with the built-in cost for the acquired traffic event. When the traffic event image displayed by the image display unit exists on a guiding route before change and does not exist on a guiding route after change, the navigation apparatus changes a representation mode for the traffic event image from a representation mode before changing the guiding route.

In accordance with the above operation, a display screen of the image display unit displays the varying representation mode for the traffic event image of the traffic event causing the guiding route to be changed. Attention is drawn to the image of the traffic event that caused the change. As a result, a user can easily recognize the cause of the change of the guiding route.

Since the navigation apparatus displays a traffic event on the guiding route before route change, the user can view the display and understand how the guiding route is changed. The invention can notify the user how the guiding route is changed regardless of the displaying of the pre-change route with the post-change route.

The features of the invention as described above can be implemented as not only a navigation apparatus but also a computer program.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

First Embodiment

Figure 1:
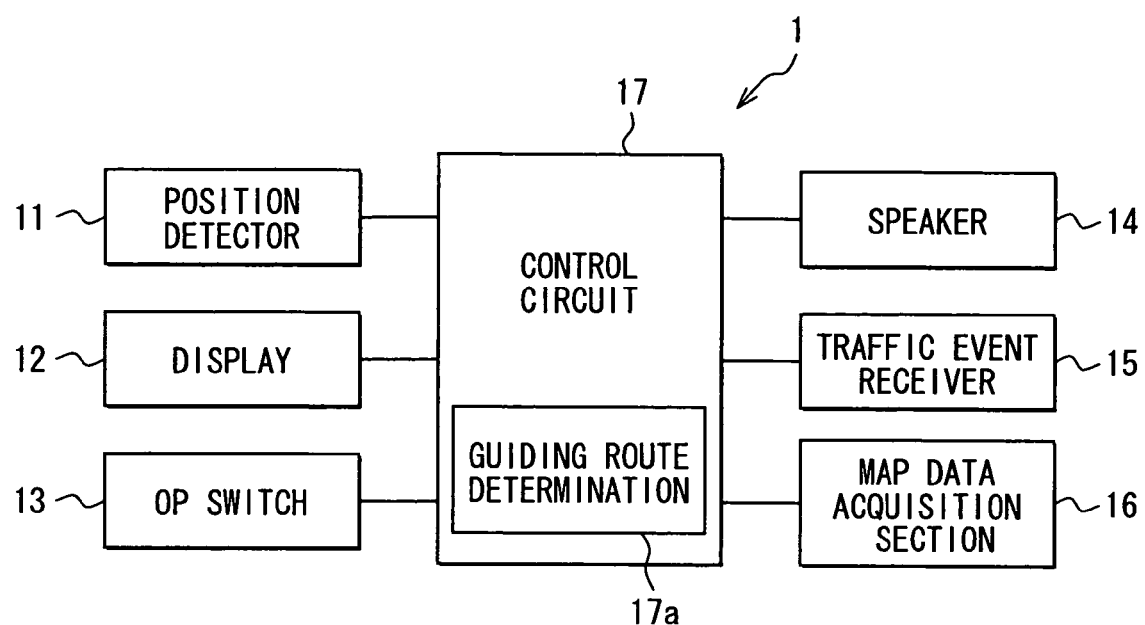
FIG. 1 shows a configuration diagram of a vehicular navigation apparatus 1 according to an embodiment of the present invention.

The following describes the first embodiment of the invention. FIG. 1 shows a hardware configuration of a vehicular navigation apparatus 1 according to the embodiment. The vehicular navigation apparatus 1 includes a position detector 11, an image display apparatus 12, an operation switch group 13, a speaker 14, a traffic event receiver 15, a map data acquisition section 16, and a control circuit 17.

The position detector 11 includes known but unshown sensors such as a geomagnetic sensor, a gyroscope, a vehicle speed sensor, and a GPS receiver. The position detector 11 outputs information for specifying a current position, orientation, and speed of the vehicle based on properties of the sensors to the control circuit 17. The image display apparatus 12 displays a video based on a video signal output from the control circuit 17 for a user. The operation switch group 13 accepts a user operation and outputs a signal corresponding to the operation to the control circuit 17.

The traffic event receiver 15 uses systems such as VICS and RDS-TMC to receive information about traffic events such as congestion, accident, and traffic regulation on roads. The information is wirelessly transmitted from transmitters such as radio broadcasting stations and on-road terminals installed along the roads. The traffic event receiver 15 outputs the received information to the control circuit 17 each time the information is received.

The map data acquisition section 16 includes a nonvolatile recording medium such as a hard disk drive (HDD) and a device for reading and writing data to the recording medium. The recording medium stores a program executed by the control circuit 17, map data for route guidance, and traffic event icon data.

The map data contains road data and facility data. The road data contains position information and type information about links and nodes, and information about relations between nodes and links. The facility data shows a position, name, and type of each facility. The traffic event icon data represents a level-2 icon (equivalent to a traffic event image example) provided for each type of traffic event.

The control circuit (equivalent to a computer) 17 is a microcomputer having a CPU, RAM, ROM, and I/O. The CPU executes a program read from the RAM or the map data acquisition section 16 for operations of the vehicular navigation apparatus 1. To execute the program, the CPU reads information from the RAM, ROM, and the map data acquisition section 16. The CPU writes information to the RAM and a recording medium for the map data acquisition section 16. The CPU exchanges signals with the position detector 11, the image display apparatus 12, the operation switch group 13, the speaker 14, and the traffic event receiver 15.

The control circuit 17 executes the program to perform processes such as a current position determination process, a guiding route determination process 17a, a map display control process, a route guidance process and the like. The current position specification process specifies the current position or orientation of the vehicle based on signals from the position detector 11 using a known technology such as map matching.

The guiding route determination process 17a accepts user input concerning a destination from the operation switch group 13 or elsewhere and determines an optimum guiding route from the current position to the destination using route cost calculation. The route cost calculation belongs to known technologies. The route cost calculation calculates costs for guiding route candidates and determines a guiding route that indicates the lowest cost. According to the embodiment, the route cost calculation requires only a route cost resulting from traffic events that are described later as mandatory elements of the cost calculation. In addition to the route cost resulting from the traffic events, the route cost calculation according to the embodiment may or may not reflect the other costs such as a cost increasing in proportion to an increase of route length, a cost decreasing in proportion to an increasing number of lanes of the route, and a cost decreasing in proportion to an increasing number of intersections in the route.

The map display control process reads map data from the map data acquisition section 16. The map display control process overlays a map image indicated by the map data with the current position, guiding route and the like and displays the image on the image display apparatus 12. The route guidance process allows the speaker 14 to generate a guidance audio signal for notifying a left or right turn. The guidance audio signal is provided when the own vehicle approximates to a guided intersection where the vehicle is required to turn to the left or right to follow the guiding route.

In the map display control process, the control circuit 17 according to the embodiment controls the image display apparatus 12 so as to display near the road where the traffic event exists in the map image an icon representing information about a traffic event received by the traffic event receiver 15. As will be described later, the control circuit 17 changes a representation mode of the icon to be displayed from the normal mode to other modes depending on the situation.

Figure 2A:
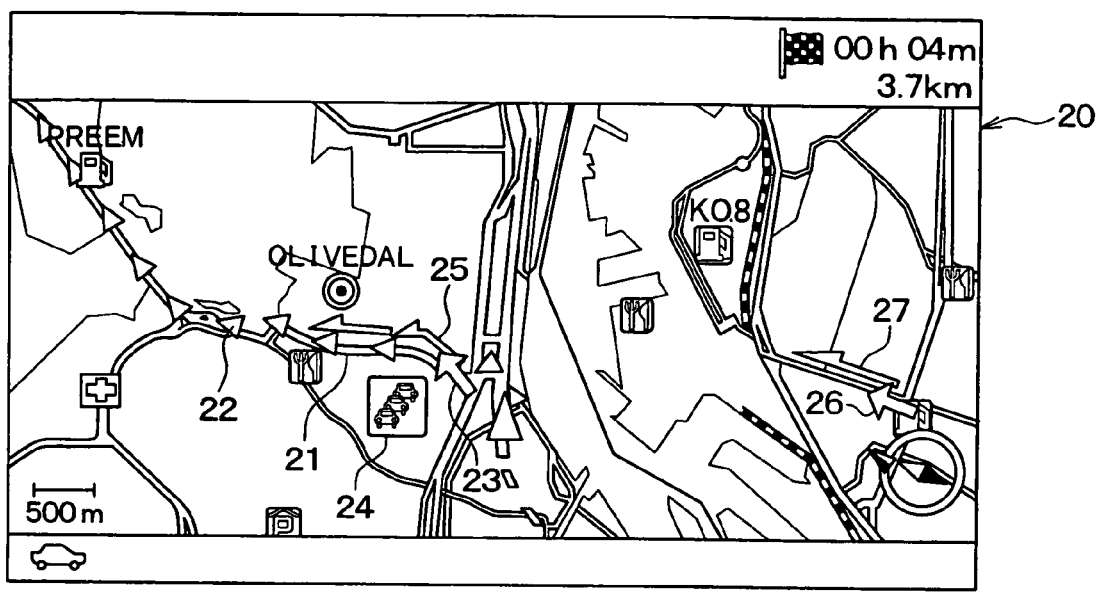
FIG. 2A shows an example of displaying an image on a display screen 20.
Figure 2B:
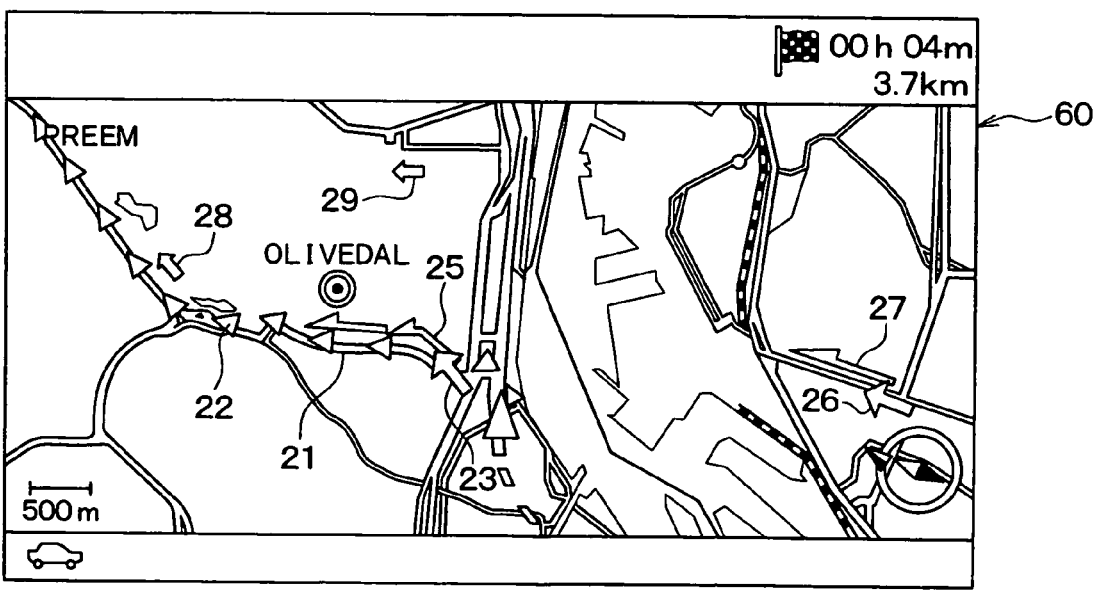
FIG. 2B shows an example of displaying an image on a display screen 60.

FIGS. 2A and 2B show a first example 20 and a second example 60 of the display screen on the image display apparatus 12. In these examples, a route 21 in the display screen 20 represents the guiding route. Triangular guiding route highlighting marks (e.g., a mark 22) are positioned along the guiding route 21 and are superimposed on map images in the display screens 20 and 60. The guiding route highlighting mark highlights the guiding route 21.

Both map images display a type-1 traffic event display icon 23 and a road highlighting icon 25 representing traffic events near parts of the guiding route 21. The icons are the examples of traffic event image. Further, both map images display a type-1 traffic event display icon 26 and a road highlighting icon 27 distant from the guiding route 21 or near a road other than the guiding route 21. The icons are the examples of traffic event image.

The map image in FIG. 2A further displays a type-2 traffic event display icon 24 near a part of the guiding route 21. The icon is the examples of a traffic event image.

The map image in the display screen 60 further displays a type-1 traffic event display icon 28 near part of the guiding route 21 and a type-1 traffic event display icon 29 near a road other than the guiding route 21. The icons represent traffic events and are equivalent to traffic event image examples.

The type-1 traffic event display icons 23, 26, 28, and 29 represent whether the corresponding traffic event is geographically local such as a road construction or somewhat lengthy such as congestion. A dot-shaped image is used to represent a geographically local traffic event. As shown in FIGS. 2A and 2B, an arrow-shaped image is used to represent a lengthy traffic event. The type-2 traffic event display icon 24 is a level-2 icon recorded in the map data acquisition section 16 and represents the corresponding traffic event in more detail. The road highlighting icons 25 and 27 are arrow images and highlight a road where the traffic event exists.

The traffic event icons 23 through 29 are assigned to the normal representation mode. Specifically, the icons 23 and 26 belonging to the type-1 traffic event display icons are assigned the same color such as red as the normal representation mode. The icon 25 belonging to the type-2 traffic event display icons are assigned to non-blinking light in the normal representation mode. The icons 25 and 27 belonging to the road highlighting icons are assigned to the same color such as red in the normal representation mode.

Figure 3:
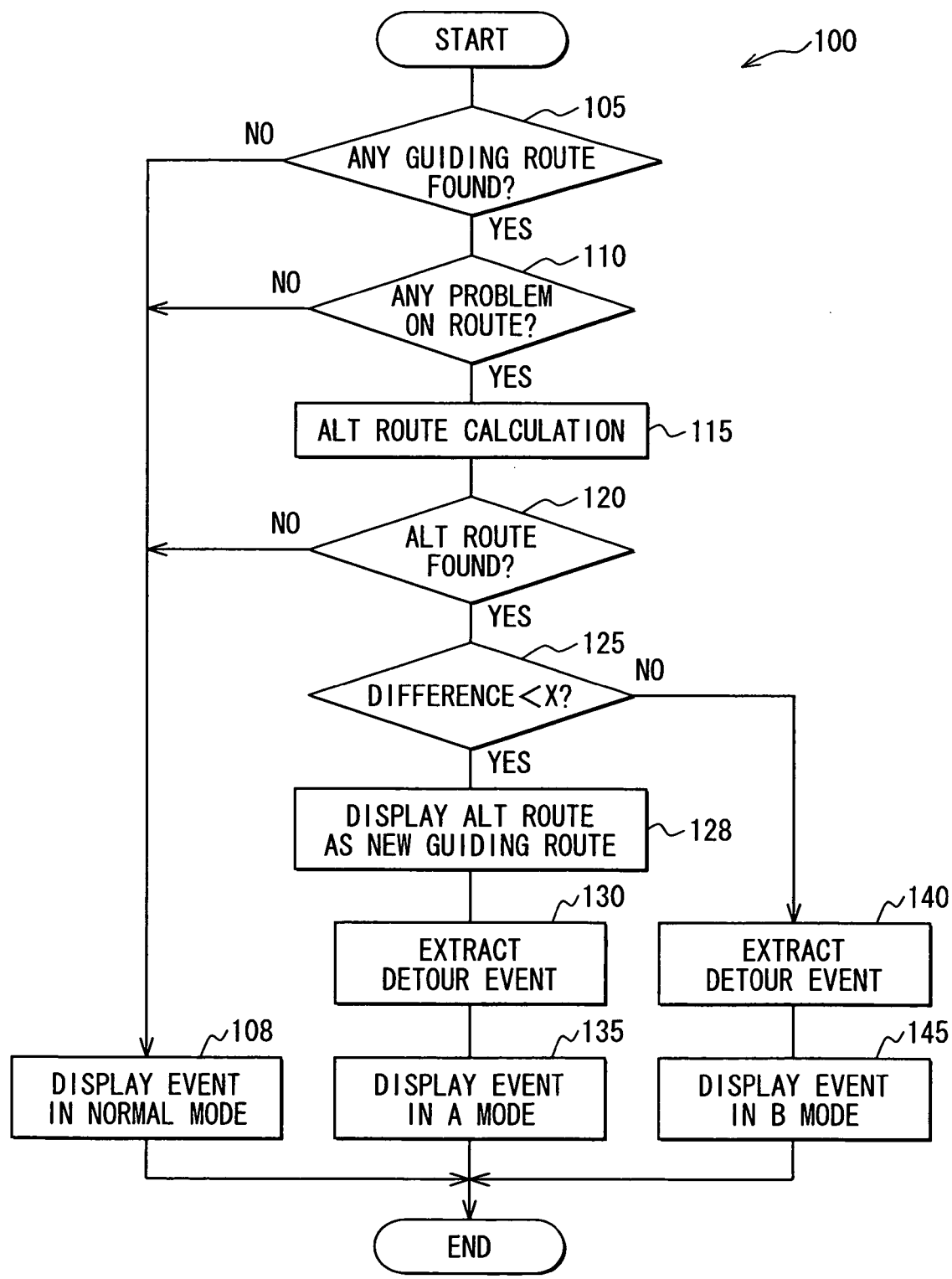
FIG. 3 shows a flowchart of a program 200 executed by a control circuit 17.

The control circuit 17 repeatedly executes a program 100 as shown in FIG. 3 for changing a representation mode of the icon to be displayed from the normal mode to the others depending on the situation. By repeatedly executing the program, the control circuit 17 controls the image display apparatus 12 (Step 108) so as to maintain the normal representation mode of the traffic event icons 23 through 27 while the guiding route determination process 17a does not determine a guiding route (Step 105) and the traffic event receiver 15 acquires no information about the traffic event indicating a traffic problem on the guiding route (Step 110). The traffic events indicating traffic problems include congestion, accident, passage prohibition, lane restriction and the like.

While acquiring information about the traffic event indicating a traffic problem on the guiding route (Step 110), the control circuit 17 uses the guiding route determination process 17a to retrieve an alternative route for replacing the current guiding route by means of the route cost calculation (Step 115). The route cost calculation reflects a route cost resulting from the traffic event. In other words, the route cost calculation incorporates the route cost resulting from the traffic event. In the route cost calculation, for example, a cost of the road indicating a traffic problem is assumed to be larger than that of the same road indicating no traffic problem.

The control circuit 17 determines whether or not there is an alternative route indicating a lower cost than the current guiding route (Step 120). When the determination result is negative, the control circuit 17 controls the image display apparatus 12 so as to maintain the normal representation mode of the traffic event icons 23 through 27 (Step 108). When the determination result is affirmative, there is an alternative route indicating a lower cost than the current guiding route. The control circuit 17 determines whether or not an increase in the alternative route from the current guiding route (i.e., a distance difference therebetween) is smaller than a reference value X (Step 125). The reference value X may be a predetermined constant value, a value varying with various conditions, or a random value within a specified range.

Figure 4A:
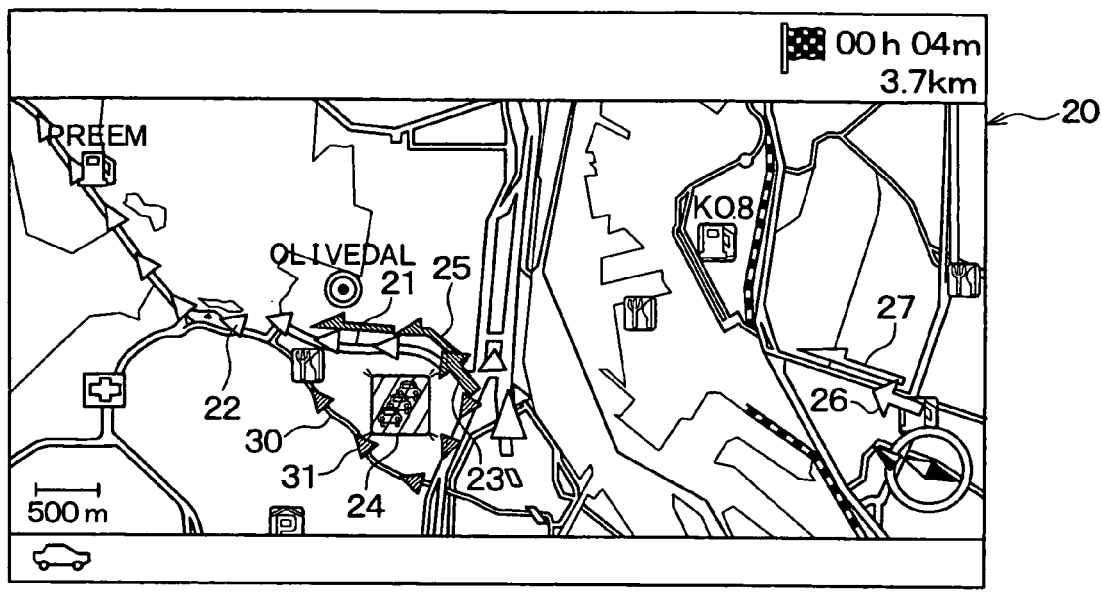
FIG. 4A shows an example of changing a display mode of a traffic event display icon on the display screen 20.
Figure 4B:
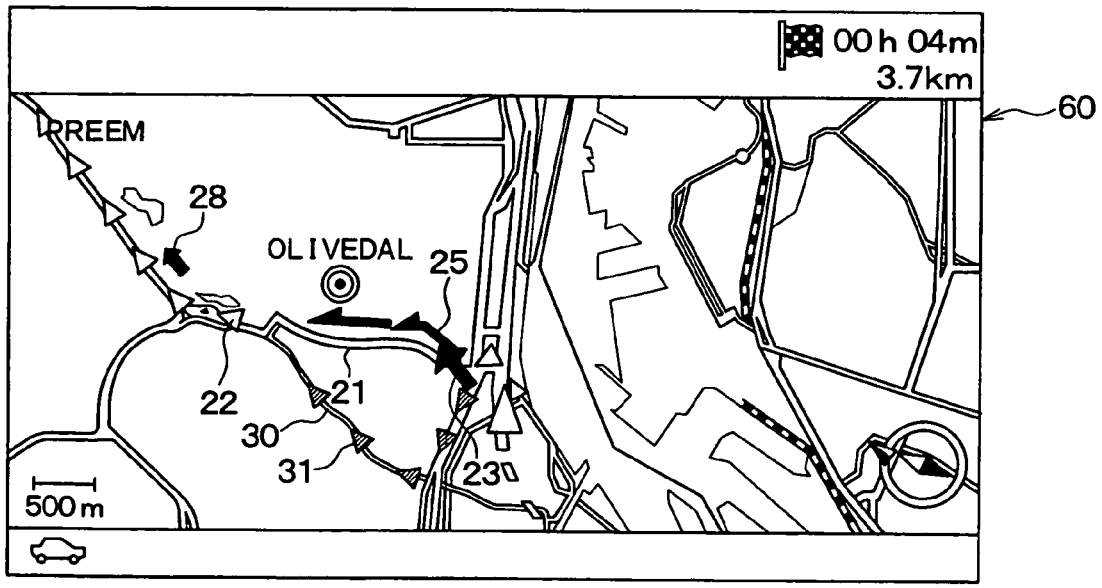
FIG. 4B shows an example of changing the display mode of the traffic event display icon on the display screen 60.

When the determination result at Step 125 is affirmative, the control circuit 17 assumes the alternative route to be a new guiding route and displays the new guiding route so as to overlap with the map image (Step 128). FIG. 4A is an example of changing the display content of FIG. 2A. FIG. 4B is an example of changing the display content of FIG. 2B. FIGS. 4A and 4B respectively show the first example 20 and the second example 60 of adding a new guiding route highlighting mark 31 for highlighting the new guiding route 30. There may be a road that belongs to the old guiding route and does not belong to the new one. Such road may be still displayed for emphasis as shown in FIG. 4A or may be hidden as shown in FIG. 4B.

After highlighting the new guiding route, the control circuit 17 extracts a detour-causing traffic event (Step 130). The detour-causing traffic event signifies a traffic problem that causes the affirmative determination at Step 120. For example, the detour-causing traffic events are represented by the icons 23, 24, and 25 in FIG. 4A and the icons 23 and 25 in FIG. 4B. The detour-causing traffic events signify congestion on the roads that belong to the old guiding route and do not belong to the new one.

In FIG. 4B, a traffic event such as a traffic problem indicated by the icon 28 is common to the old and new guiding routes and is not a detour-causing traffic event.

The type-1 traffic event display icon 23, the type-2 traffic event display icon 24, and the road highlighting icon 25 correspond to the extracted detour-causing traffic events. The control circuit 17 changes the representation mode of the icons to a representation mode A different from the normal representation mode assigned to the icons (Step 135). The representation mode A is equivalent to an example of the first another representation mode.

The type-1 traffic event display icon 28 indicates a traffic event on the old guiding route and corresponds to a non-detour-causing traffic event. At Step 135, the control circuit 17 also changes the representation mode of the icon 28 to the representation mode A different from the normal representation mode originally assigned to the icon. The representation mode A is equivalent to an example of the first another representation mode.

The icons 23 and 25 correspond to the detour-causing traffic event on the old guiding route, namely, the traffic event the new guiding route circumvented. The icon 28 corresponds to the non-detour-causing traffic event on the old guiding route, namely, the traffic event the new guiding route could not circumvent. The icons may be changed to the same representation mode as shown in FIG. 4B or to different representation modes distinguishable from each other.

For example, the representation mode A for the traffic event display icons 23 and 25 may use a color such as black different from the normal color as shown in FIGS. 4A and 4B. The representation mode A for the traffic event display icon 28 may also use a color such as black different from the normal color as shown in FIG. 4B.

Alternatively, the traffic event display icons 23 and 25 may use a first color such as black different from the normal color. The traffic event display icon 28 may use a second color such as pink different from the normal color and the first color.

The traffic event display icons 23 and 25 correspond to the traffic events that occur on the old guiding route, are changed by the old guiding route, and are circumvented by the new guiding route (equivalent to the alternative route). The traffic event display icon 28 corresponds to the traffic event that is not circumvented by the new guiding route. As mentioned above, the control circuit 17 may display these icons in respectively distinguishable representation modes from each other.

As mentioned above, the guiding route can be changed to the new one. In that case, the control circuit 17 can use the representation mode different from the traffic event display icon 28 corresponding to the traffic event not circumvented by the new guiding route to display the traffic event display icons 23 and 25 corresponding to the traffic events circumvented by the new guiding route. Thus, the user can easily recognize the circumvented traffic event.

The control circuit 17 can display the circumvented traffic event on the old guiding route without highlighting the old guiding route. Thus, the user can understand the trace of the old guiding route.

As shown in FIG. 4A, for example, the representation mode A for the type-2 traffic event display icon 24 may blink repeatedly.

At Step 135, as shown in FIG. 4B, the control circuit 17 may hide, from the map image, the traffic event display icons 26, 27, and 29 (see FIG. 2B) other than the traffic event display icons 23, 25, and 28 indicating the traffic events on the old guiding route.

In the example of FIG. 4B, the control circuit 17 displays a traffic event display icon indicating a traffic event on the old guiding route in the display mode different from the normal one regardless of whether or not the traffic event was circumvented. The control circuit 17 hides traffic event display icons indicating traffic events other than those on the old guiding route.

The control circuit 17 may control the image display apparatus 12 to display an image 22 for emphasizing the new guiding route and the traffic event display icons 23, 25, and 28 corresponding to the traffic events on the old guiding route and to hide the traffic event display icons 26, 27, and 29 corresponding to the traffic events occurring elsewhere than the old guiding route.

In this manner, the control circuit 17 displays traffic events on the new and old guiding routes and hides traffic events at locations other than those on the old guiding route to display information needed for the user. The user can easily view the necessary information.

Based on these operations, the control circuit 17 determines whether or not to change the guiding route to the destination in accordance with the acquired traffic event. Based on the affirmative determination, the control circuit 17 controls the image display apparatus 12 to display the icon corresponding to the traffic event causing the affirmative determination near the road indicating the traffic event on the map image in the first another representation mode for the traffic event image different from the normal representation mode originally assigned to the traffic event.

Accordingly, when the icons 23, 24, and 25 indicate the traffic events causing the guiding route to change, the icons are displayed in the representation mode A different from the normal representation mode originally assigned to the icons. The user's attention is drawn to the image of the traffic event that caused the guiding route to change. As a result, the user can easily recognize why the guiding route has been changed.

When a traffic event caused the affirmative determination to be able to change the guiding route, the traffic event is present on the guiding route 21. The control circuit 17 determines the capability of changing the guiding route based on such a direct factor as existence of the traffic event on the guiding route. Therefore, it is possible to more accurately determine whether or not the guiding route can be changed.

The control circuit 17 displays traffic events on the guiding route before the route change. Even though the guiding route before the route change is not displayed along with the guiding route after the route change, the user can view the display to recognize how the guiding route is changed.

When Step 125 causes a negative determination result, the alternative route is not assumed to be a new guiding route. The reason follows. An alternative route may cause the affirmative result at Step 120 but the negative result at Step 125. Such alternative route is more advantageous than the current guiding route in terms of costs but requires a very long distance. The alternative route may be more advantageous than the current guiding route in terms of costs but may cause anxiety of occupants because of too long a distance. Such route is prevented from being used as a new guiding route so as not to cause anxiety of the user.

When the determination at Step 125 causes the negative result, the control circuit 17 extracts a detour-causing traffic event (Step 140). The control circuit 17 changes the representation mode for the icons 23 through 25 corresponding to the extracted detour-causing traffic event to a representation mode B (Step 135). The representation mode B is equivalent to a second another representation mode and differs from the normal representation mode and the representation mode A assigned to the icons.

For example, the representation mode B for the type-1 traffic event display icon 23 may be blue. The representation mode B for the type-2 traffic event display icon 24 may blink at a slower cycle than the representation mode A as shown in FIG. 4A. Further, the representation mode B for the road highlighting icon 25 may be blue.

The icons 23 through 25 correspond to a traffic event that causes the alternative route to be less costly than the present guiding route based on the negative result from the determination at Step 125. The control circuit 17 controls the image display unit 12 so as to display the icons 23 through 25 in another representation mode B near the road on the map image where the traffic event exists.

When the alternative route is determined to be inappropriate as a guiding route in terms of not causing anxiety of the user, the representation mode B is used to display the icon for the traffic event that caused the alternative route to be more cost-effective than the current guiding route. By viewing the icon displayed in the representation mode B, the user can recognize that the current guiding route is not necessarily optimal in terms of costs.

Second Embodiment

The following describes the second embodiment of the invention. The vehicular navigation apparatus 1 according to the second embodiment includes not only all the functions of the vehicular navigation apparatus 1 according to the first embodiment but also the following functions.

Figures 5, 6:
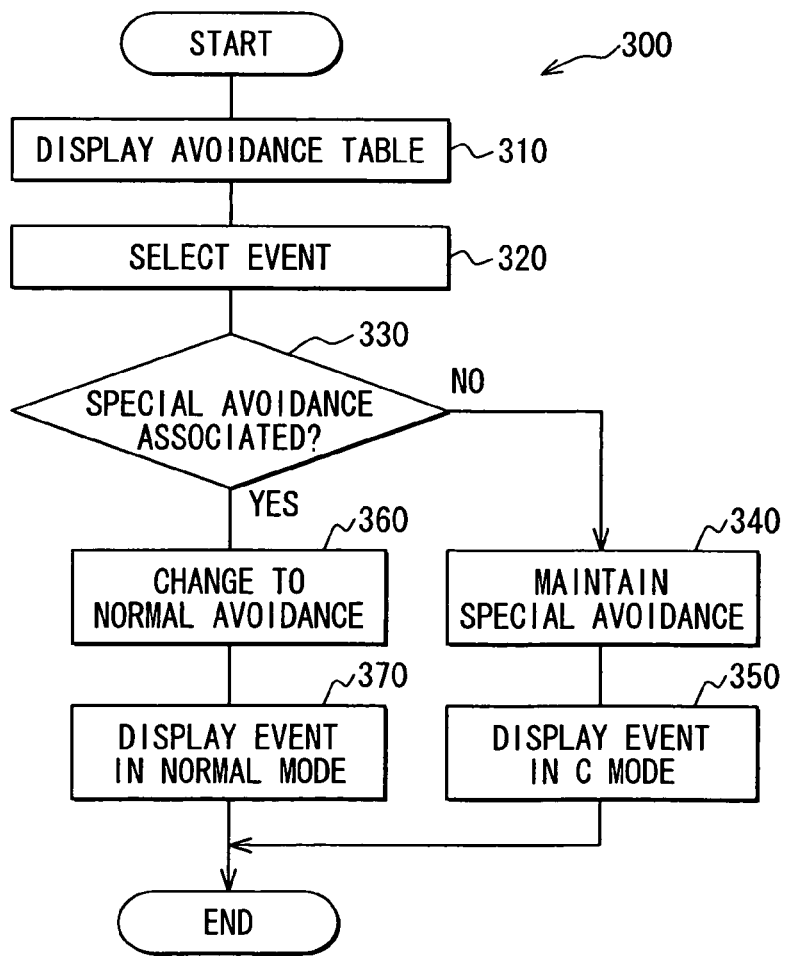
FIG. 5 shows an avoidance setting table according to a second embodiment.
FIG. 6 shows a flowchart of a program 300 executed by the control circuit 17.

The map data acquisition section 16 according to the embodiment stores an avoidance setting table. FIG. 5 shows an example of the avoidance setting table. The avoidance setting table contains multiple records. The records correspond to different traffic events. The traffic events are acquired from the traffic event receiver 15. The record corresponding to one traffic event contains data for specifying the traffic event and data (equivalent to an example of a special avoidance identifier) indicating distinction between normal avoidance and special avoidance for the traffic event.

When determining a guiding route, the data indicating the normal avoidance specifies that the guiding route may or may not include the road containing a traffic event targeted for the normal avoidance based on route costs and the like for the road. When determining a guiding route, the data indicating the special avoidance specifies that the guiding route does not include the road containing a traffic event targeted for the special avoidance regardless of the route cost for the road.

Figures 7, 8:
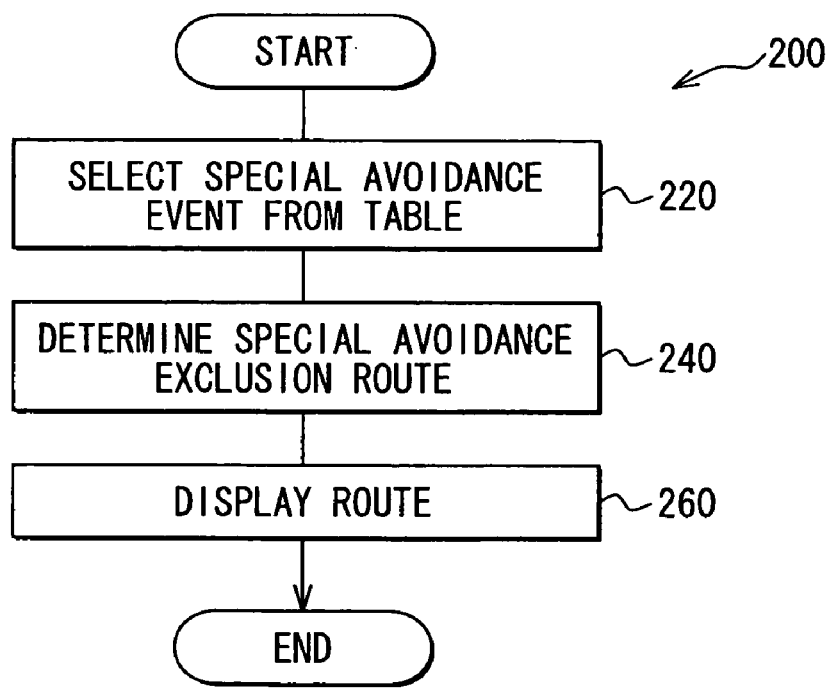
FIG. 7 shows another avoidance setting table according to the second embodiment.
FIG. 8 shows a flowchart of the program 200 executed by the control circuit 17.

When acquiring new information about the traffic event from the traffic event receiver 15, the control circuit 17 adds the record for the traffic event to the avoidance setting table and assigns a value of the normal avoidance to the record. The control circuit 17 executes a program 300 as shown in FIG. 6 in accordance with a user operation for the operation switch group 13 to display the avoidance setting table on the image display apparatus 12 (Step 310). When the user uses the display and uses the operation switch group 13 to select a traffic event, the control circuit 17 accepts the user operation (Step 320). When the normal avoidance is associated with the accepted traffic event to be selected (Step 330), the control circuit 17 associates the special avoidance with the record for the traffic event (Step 340). FIG. 7 shows the avoidance setting table after a traffic event 1 is changed to the special avoidance.

After Step 340, the control circuit 17 controls the image display apparatus 12 so as to change the display mode of the icon corresponding to the traffic event that is changed to the special avoidance (Step 350). The display mode is changed to a representation mode C (equivalent to a third another representation mode) for the icon. The representation mode C differs from the normal representation mode assigned to the icon.

When the special avoidance is associated with the accepted traffic event to be selected (Step 330), the control circuit 17 associates the normal avoidance with the record for the traffic event (Step 360). The control circuit 17 then controls the image display apparatus 12 so as to change the display mode of the icon for the traffic event that is changed to the normal avoidance (Step 370). The display mode is changed to the normal representation mode for the icon.

When the guiding route is already determined, the control circuit 17 repeatedly executes a program 200 in FIG. 8 as part of the guiding route determination process 17a. In this manner, the control circuit 17 selects the traffic event associated with the special avoidance from the avoidance setting table (Step 220). The control circuit 17 excludes a road containing the selected traffic event from guiding route candidates and performs the route cost calculation to determine the guiding route (Step 240). The control circuit 17 allows the image display apparatus 12 to reflect the display of the determined guiding route (Step 260).

Figure 9:
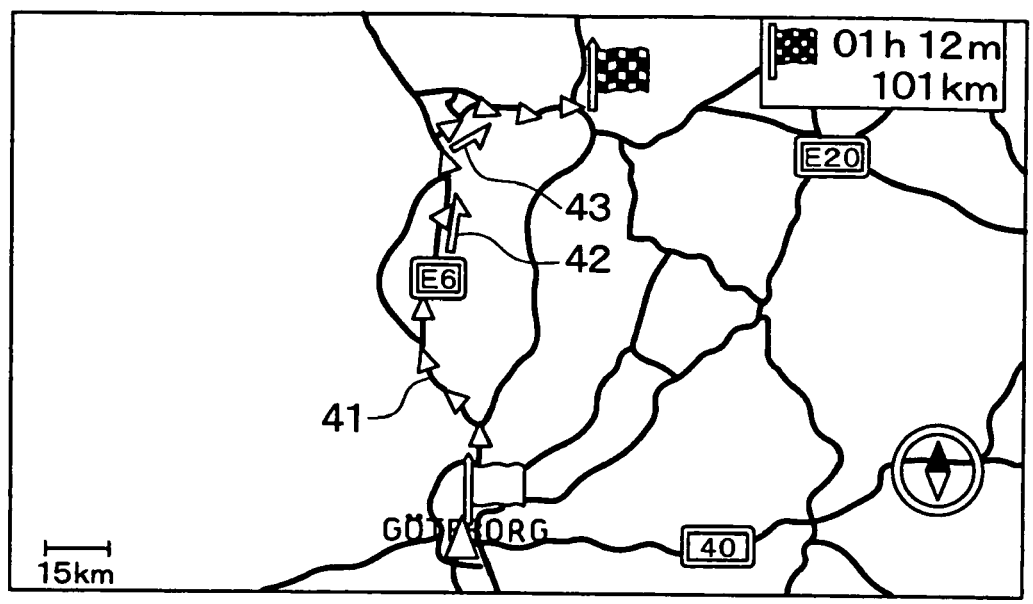
FIG. 9 shows an example of displaying an image on the display screen 20.

For example, FIG. 9 shows two traffic events of normal avoidance on a guiding route 41. Let us suppose that type-1 traffic event display icons 42 and 43 correspond to the traffic events and are displayed near roads including the traffic events. The icons 42 and 43 are displayed in the normal display mode because the corresponding traffic events both belong to the normal avoidance.

Figure 10:
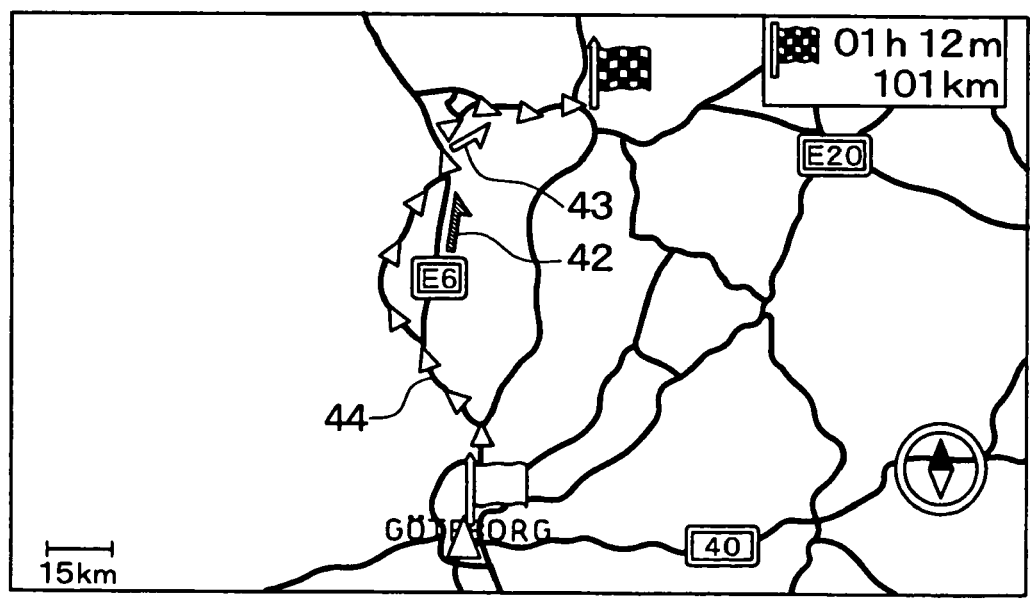
FIG. 10 shows another example of displaying an image on the display screen 20.

In this case, the user may assign the special avoidance to the traffic event corresponding to the icon 42 (see Steps 310 through 340 of the program 300). The control circuit 17 follows Step 350 of the program 300 to change the representation mode of the icon 42 to the representation mode C (displayed in black) as shown in FIG. 10. The control circuit 17 further follows the process of the program 200 to exclude the road containing the traffic event of the special avoidance and determine and display a new guiding route 44.

The control circuit 17 stores any of the acquired traffic events in association with the special avoidance data indicating exclusion of the traffic event from the guiding route. When determining a guiding route, the control circuit 17 excludes the road containing the traffic event associated with the special avoidance identifier from the guiding route regardless of the route cost for the road. The control circuit 17 controls the image display apparatus 12 so as to display an icon corresponding to the traffic event associated with the special avoidance data in the representation mode C near the road containing the traffic event on the map image together with the guiding route. Therefore, the user can recognize not only a road excluded from the guiding route regardless of the route cost but also a traffic event of the road in an emphasized manner.

Figure 11:
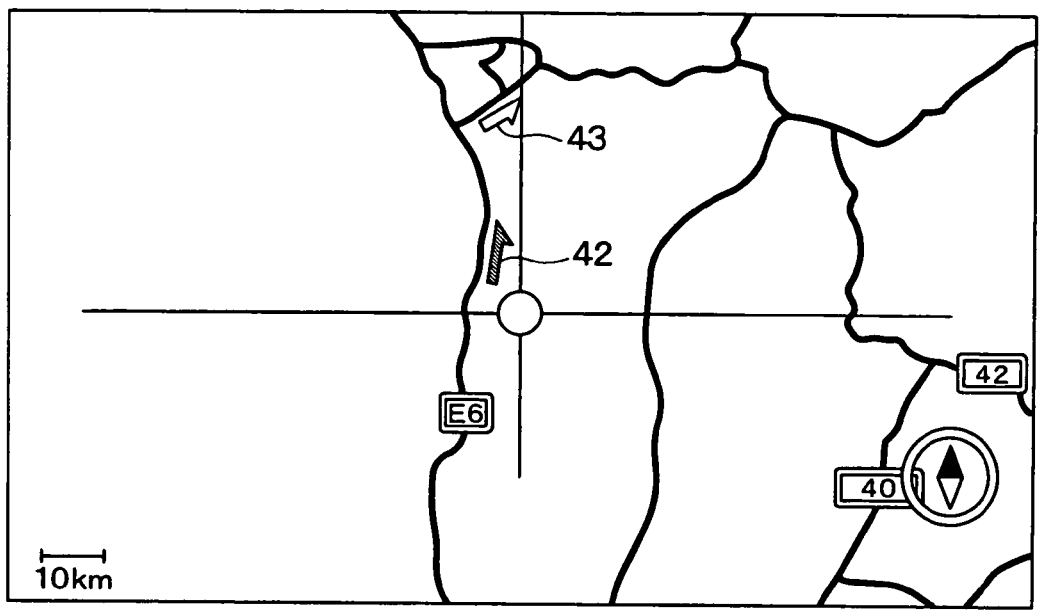
FIG. 11 shows still another example of displaying an image on the display screen 20.

When the vehicular navigation apparatus 1 reaches an endpoint of the guiding route, i.e., a destination, for example, the control circuit 17 stops highlighting the guiding route. At this time, the control circuit 17 may continue displaying the icon 42 for the traffic event in the representation mode C in the map image as shown in FIG. 11. Even when the guiding route is not displayed, the user can recognize not only a road excluded from the guiding route regardless of the route cost but also a traffic event of the road in the emphasized manner. In addition, the control circuit 17 may continue displaying the icon 43 for the traffic event in the normal representation mode in the map image.

The avoidance setting table continuously records a traffic event for special avoidance. When the user re-selects a destination and the control circuit 17 performs the guiding route determination process 17a anew, the control circuit 17 may exclude a road containing the traffic event for special avoidance from guiding route candidates regardless of the route cost.

As mentioned above, when a road contains the traffic event associated with the special avoidance, the control circuit 17 excludes that road from the guiding route candidates regardless of the cost for the road. However, a hypothetical guiding route containing such road may sometimes become much less costly than an actually determined guiding route. For example, let us suppose that the user empirically knows a heavily congested road and associates it with the special avoidance, but the congestion of the road is solved afterwards for some reasons such as road expansion or the like. In such case, an inefficient guiding route may be selected.

To solve this kind of problem, the control circuit 17 determines a route at Step 240 of the program 200 by comparing a route cost for the hypothetical guiding route with the one for the determined guiding route. When the route cost for the hypothetical guiding route is lower than that for the determined guiding route by a standard cost difference or more, the control circuit 17 may control the image display apparatus 12 so as to display the icon for the traffic event associated with the special avoidance in a representation mode D for the icon as well as the guiding route determined by the route determination process 17a. The representation mode D is equivalent to an example of a fourth another representation mode and differs from the normal representation mode and the representation mode C assigned to the icon for the traffic event. The standard cost difference may be a pre-stored constant value, a value varying with various conditions, or a random value within a specified range.

Figure 12:
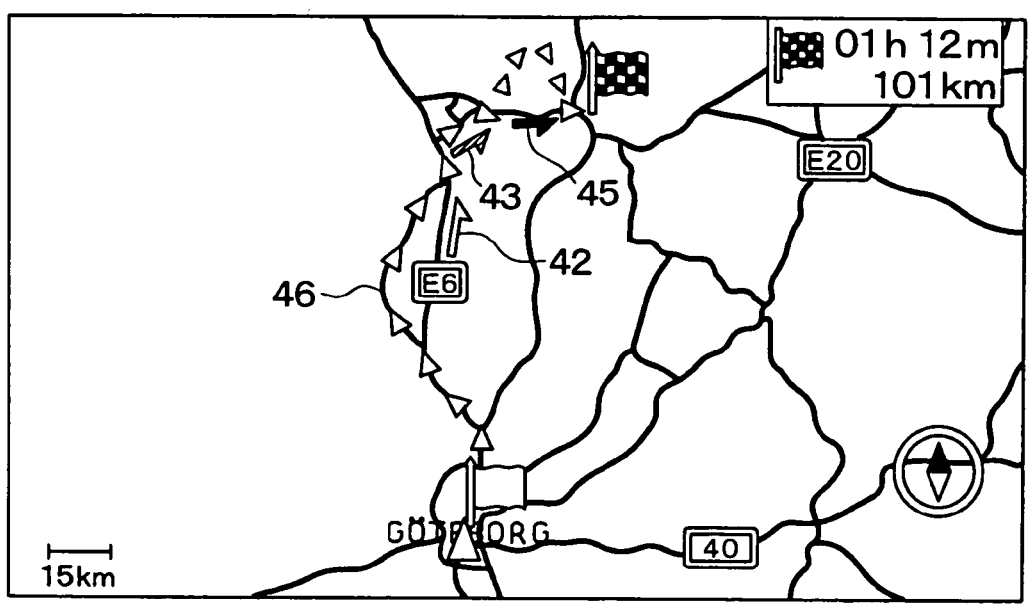
FIG. 12 shows still yet another example of displaying an image on the display screen 20.

FIG. 12 shows an example of displaying an image on the image display apparatus 12 according to the above-mentioned operations. In FIG. 12, the user associates the special avoidance with traffic events corresponding to the icons 42 and 45. The user excludes the road containing the traffic event corresponding to the icon 45 from the guiding route. Therefore, the control circuit 17 has selected a guiding route 46 that excessively circumvents that road. The control circuit 17 accordingly displays the icon 45 in the representation mode D (i.e., in blue).

Even though a road is designated to be avoided regardless of the route cost, inclusion of such road in the guiding route may sometimes be sufficiently more effective than otherwise in terms of the route cost. In that case, the information of the benefit route switching can be notified to the user, allowing him or her to reconsider the designation of the special avoidance.

In the above-mentioned embodiment, the map data acquisition section 16 is equivalent to an example of storage media. The traffic event receiver 15 is equivalent to an example of a traffic event acquisition unit. The control circuit 17 functions as the routing unit by executing the guiding route determination process 17*a*. The control circuit 17 functions as an example of a display control unit by executing Steps 108, 135, and 145 of the program 100. The control circuit 17 also functions as an example of the display control unit by executing Steps 350 and 370 of the program 300. The control circuit 17 functions as an example of a determination unit by executing Steps 120 and 125 of the program 100. The control circuit 17 functions as an example of a first partial determination unit by executing Step 120 of the program 100. The control circuit 17 functions as an example of a second partial determination unit by executing Step 125 of the program 100.

Other Embodiments

While there have been described specific preferred embodiments of the present invention, it is to be distinctly understood that the present invention is not limited thereto but may be otherwise variously embodied within the spirit and scope of the invention.

For example, the above-mentioned embodiments have described the colors and blinking or not of the icons as examples of the representation modes. The representation modes are not limited thereto and may use orientation, animation, and dark and light coloring of icons.

A route may detour so excessively as to be inconvenient for occupants but may be designated to be a new guiding route. In such a case, Steps 125, 140, and 145 of the program 100 may be omitted. Step 128 may immediately follow the affirmative determination resulting from Step 120, when applicable.

According to the above-mentioned embodiments, the control circuit 17 branches to the affirmative determination at Step 125 in FIG. 3 and then immediately designates the alternative route to be a new guiding route. Instead, the following may be preferable. The control circuit 17 uses the image display apparatus 12 or the speaker 14 and inquires of the user whether or not to designate the alternative route to be a new guiding route. The control circuit 17 waits until the user operates the operation switch group 13 in response to the inquiry. According to a user operation, when applicable, the control circuit 17 determines whether or not to designate the alternative route to be the new guiding route. In this case, Steps 120 and 125 not only partly determine whether or not to change the guiding route, but also determine whether or not to be able to change the guiding route.

When it is determined that the guiding route can be changed in this case, the control circuit 17 may display a new route or change the display mode for the traffic event display icon on the old route as shown in FIGS. 4A and 4B or may perform other processes, without awaiting a user response operation. The control circuit 17 may display the alternative route and may process Steps 130 and 135 in FIG. 3 based on the determination that the guiding route can be changed.

According to the above-mentioned embodiments, a given icon is displayed in the normal representation mode. The same icon at the same position changes the representation mode afterwards. However, the present invention does not require a chronological change of the representation mode for a given traffic event icon. When a traffic event such as an accident occurs, for example, an icon for the traffic event may first appear on a map image in a representation mode different from the normal representation mode. In this case, the configuration of the present invention can be satisfied under the following condition. That is, the normal representation mode is used to display the other traffic event icons that are included in the map display screen and are not causing the change of the guiding route, and the representation mode A is used to display the icon associated with the traffic event that causes the change of the guiding route.

According to the second embodiment, the user designates the normal avoidance or the special avoidance in the avoidance setting table. The control circuit 17 may use different methods to change data for the normal avoidance to data for the special avoidance. For example, when a vehicle deviates from the guiding route to avoid a traffic event on the guiding route, the traffic event may be newly associated with the special avoidance.

Data requiring update such as avoidance data may not be necessarily stored in the map data acquisition section 16. The data may be stored in the other recording media such as a flash memory, an EEPROM, and a backup RAM that can continuously retain data even when a main power supply stops supplying power to the vehicular navigation apparatus 1. In this case, the storage medium for the map data acquisition section 16 is not limited to a rewritable storage medium such as hard disks. That is, the map data acquisition section 16 may be an unwritable storage medium such as a DVD, a CD-ROM or the like.

In the above-mentioned embodiments, the control circuit 17 executes the programs to implement the functions. The functions may also be implemented using hardware having equivalent functions such as a Field Programmable Gate Array (FPGA) capable of programming the circuit configuration.

The navigation apparatus according to the above embodiments is intended to be mounted on the vehicle. However, the navigation apparatus may be mounted on marine vessels, airplanes, or may be portable. For example, a mobile telephone having functions of the navigation apparatus is also equivalent to the navigation apparatus according to the present invention.

It will be obvious to those skilled in the art that various changes may be made in the above-described embodiments of the present invention. However, the scope of the present invention should be determined by the following claims.

What is claimed is:

1. A navigation apparatus for displaying a guiding route on an image display apparatus, the apparatus comprising:
   a routing unit for determining the guiding route using route cost calculation;
   a traffic event acquisition unit for sequentially acquiring a traffic event on a road;
   a traffic event display control unit for controlling the image display apparatus so as to display a traffic event image representing a traffic event acquired by the traffic event acquisition unit near a road containing the traffic event on a map image in a normal representation mode assigned to the traffic event image; and a determination unit for building a cost for a traffic event acquired by the traffic event acquisition unit into the route cost calculation and determining possibility of changing a guiding route based on a result of the route cost calculation, wherein the traffic event display control unit controls the image display apparatus based on an affirmative determination of the determination unit so as to display simultaneously on the map image: (i) a post-change guiding route, (ii) a pre-change guiding route, and (iii) a traffic event image corresponding to a traffic event on the pre-change guiding route causing the affirmative determination near a road containing the traffic event on the map image, in a first another representation mode of the traffic event image different from the normal representation mode assigned to the traffic event image.

2. The navigation apparatus of claim 1,
wherein a traffic event causing the affirmative determination from the determination unit exists on the guiding route.

3. The navigation apparatus of claim 1, wherein
the post-change guiding route and the pre-change guiding route are both signified when simultaneously displayed on the same map image.

4. A navigation apparatus for displaying a guiding route on an image display apparatus, the apparatus comprising:
a routing unit for determining the guiding route using route cost calculation;
a traffic event acquisition unit for sequentially acquiring a traffic event on a road;
a traffic event display control unit for controlling the image display apparatus so as to display a traffic event image representing a traffic event acquired by the traffic event acquisition unit near a road containing the traffic event on a map image in a normal representation mode assigned to the traffic event image; and
a determination unit for building a cost for a traffic event acquired by the traffic event acquisition unit into the route cost calculation and determining possibility of changing a guiding route based on a result of the route cost calculation,
wherein the traffic event display control unit controls the image display apparatus based on an affirmative determination of the determination unit so as to display simultaneously on the map image: (i) a post-change guiding route, (ii) a pre-change guiding route, and (iii) a traffic event image corresponding to a traffic event on the pre-change guiding route causing the affirmative determination near a road containing the traffic event on the map image, in a first another representation mode of the traffic event image different from the normal representation mode assigned to the traffic event image,
wherein the determination unit includes a first partial determination unit and a second partial determination unit,
wherein the first partial determination unit uses the route cost calculation having a cost for a traffic event acquired by the traffic event acquisition unit and determines whether or not there is an alternative route less costly than a current guiding route,
wherein the second partial determination unit responds to a possible affirmative determination from the first partial determination unit and determines whether or not the alternative route is longer than a current guiding route by an amount smaller than a reference value,
wherein the determination unit determines capability of changing a guiding route based on an affirmative determination of the second partial determination unit,
wherein the determination unit determines incapability of changing a guiding route based on a negative determination of the second partial determination unit,
wherein, based on a negative determination of the second partial determination unit, the traffic event display control unit controls the image display apparatus so as to display the traffic event image corresponding to the traffic event causing the alternative route to be less costly than the guiding route near the road containing the traffic event on the map image in a second another representation mode for the traffic event image, and
wherein the second another representation mode differs from the normal representation mode assigned to the traffic event image and the first another representation mode for the traffic event image.

5. A navigation apparatus for displaying a guiding route on an image display apparatus, the apparatus comprising:
a routing unit for determining the guiding route using route cost calculation;
a traffic event acquisition unit for sequentially acquiring a traffic event on a road;
a traffic event display control unit for controlling the image display apparatus so as to display a traffic event image representing a traffic event acquired by the traffic event acquisition unit near a road containing the traffic event on a map image in a normal representation mode assigned to the traffic event image;
a determination unit for building a cost for a traffic event acquired by the traffic event acquisition unit into the route cost calculation and determining possibility of changing a guiding route based on a result of the route cost calculation,
wherein the traffic event display control unit controls the image display apparatus based on an affirmative determination of the determination unit so as to display simultaneously on the map image: (i) a post-change guiding route, (ii) a pre-change guiding route, and (iii) a traffic event image corresponding to a traffic event on the pre-change guiding route causing the affirmative determination near a road containing the traffic event on the map image, in a first another representation mode of the traffic event image different from the normal representation mode assigned to the traffic event image; and
a storage medium for storing a traffic event acquired by the traffic event acquisition unit in association with a special avoidance identifier indicating exclusion of the traffic event from a guiding route,
wherein the routing unit excludes a road containing a traffic event associated with the special avoidance identifier in the storage medium from the guiding route regardless of a route cost for the road, and
wherein the traffic event display control unit controls the image display apparatus so as to display the guiding route and a traffic event image corresponding to a traffic event associated with the special avoidance identifier in the storage medium near a road containing the traffic event on a map image in a third another representation mode that differs from the normal representation mode assigned to the traffic event image.

6. A navigation apparatus for displaying a guiding route on an image display apparatus, the apparatus comprising:
a routing unit for determining the guiding route using route cost calculation;
a traffic event acquisition unit for sequentially acquiring a traffic event on a road;
a traffic event display control unit for controlling the image display apparatus so as to display a traffic event image representing a traffic event acquired by the traffic event acquisition unit near a road containing the traffic event on a map image in a normal representation mode assigned to the traffic event image; and a determination unit for building a cost for a traffic event acquired by the traffic event acquisition unit into the route cost calculation and determining possibility of changing a guiding route based on a result of the route cost calculation, a storage medium for storing a traffic event acquired by the traffic event acquisition unit in association with a special avoidance identifier indicating exclusion of the traffic event from a guiding route, wherein the traffic event display control unit controls the image display apparatus based on an affirmative determination of the determination unit so as to display simultaneously on the map image: (i) a post-change guiding route, (ii) a pre-change guiding route, and (iii) a traffic event image corresponding to a traffic event on the pre-change guiding route causing the affirmative determination near a road containing the traffic event on the map image, in a first another representation mode of the traffic event image different from the normal representation mode assigned to the traffic event image, wherein the routing unit excludes a road containing a traffic event associated with the special avoidance identifier in the storage medium from the guiding route regardless of a route cost for the road, and wherein the traffic event display control unit controls the image display apparatus so as to display the guiding route and a traffic event image corresponding to a traffic event associated with the special avoidance identifier in the storage medium near a road containing the traffic event on a map image in a third another representation mode that differs from the normal representation mode assigned to the traffic event image, wherein the traffic event display control unit controls the image display apparatus so as to display a traffic event image corresponding to a traffic event associated with the special avoidance identifier in the storage medium near a road containing the traffic event on a map image in the third representation mode for the traffic event image even after the guiding route is hidden.

7. A navigation apparatus for displaying a guiding route on an image display apparatus, the apparatus comprising:

a routing unit for determining the guiding route using route cost calculation;

a traffic event acquisition unit for sequentially acquiring a traffic event on a road;

a traffic event display control unit for controlling the image display apparatus so as to display a traffic event image representing a traffic event acquired by the traffic event acquisition unit near a road containing the traffic event on a map image in a normal representation mode assigned to the traffic event image; and a determination unit for building a cost for a traffic event acquired by the traffic event acquisition unit into the route cost calculation and determining possibility of changing a guiding route based on a result of the route cost calculation, a storage medium for storing a traffic event acquired by the traffic event acquisition unit in association with a special avoidance identifier indicating exclusion of the traffic event from a guiding route, wherein the traffic event display control unit controls the image display apparatus based on an affirmative determination of the determination unit so as to display simultaneously on the map image: (i) a post-change guiding route, (ii) a pre-change guiding route, and (iii) a traffic event image corresponding to a traffic event on the pre-change guiding route causing the affirmative determination near a road containing the traffic event on the map image, in a first another representation mode of the traffic event image different from the normal representation mode assigned to the traffic event image, wherein the routing unit excludes a road containing a traffic event associated with the special avoidance identifier in the storage medium from the guiding route regardless of a route cost for the road, and wherein the traffic event display control unit controls the image display apparatus so as to display the guiding route and a traffic event image corresponding to a traffic event associated with the special avoidance identifier in the storage medium near a road containing the traffic event on a map image in a third another representation mode that differs from the normal representation mode assigned to the traffic event image, wherein, when the routing unit performs a route cost calculation to find a route cost in including a road containing a traffic event associated with the special avoidance identifier in the guiding route to be smaller than a route cost in excluding the road from the guiding route by a standard cost difference or more, the traffic event display control unit controls the image display apparatus to display a traffic event image corresponding to the traffic event near the road in a fourth another representation mode for the traffic event image together with the guiding route determined by the routing unit, and wherein the fourth another representation mode differs from the normal representation mode assigned to the traffic event image and the third another representation mode for the traffic event image.

8. A navigation apparatus for displaying a guiding route on an image display apparatus, the apparatus comprising:

a routing unit for determining the guiding route using route cost calculation;

a traffic event acquisition unit for sequentially acquiring a traffic event on a road;

a traffic event display control unit for controlling the image display apparatus so as to display a traffic event image representing a traffic event acquired by the traffic event acquisition unit near a road containing the traffic event on a map image in a normal representation mode assigned to the traffic event image; and a determination unit for building a cost for a traffic event acquired by the traffic event acquisition unit into the route cost calculation and determining possibility of changing a guiding route based on a result of the route cost calculation, wherein the traffic event display control unit controls the image display apparatus based on an affirmative determination of the determination unit so as to display simultaneously on the map image: (i) a post-change guiding route, (ii) a pre-change guiding route, and (iii) a traffic event image corresponding to a traffic event on the pre-change guiding route causing the affirmative determination near a road containing the traffic event on the map image, in a first another representation mode of the traffic event image different from the normal representation mode assigned to the traffic event image, wherein a traffic event causing the affirmative determination from the determination unit exists on the guiding route, wherein the traffic event display control unit controls the image display apparatus to display a traffic event on the guiding route in a representation mode capable of making a distinction between a traffic event image corresponding to a traffic event circumvented by an alternative route to substitute the guiding route and a traffic event image corresponding to a traffic event not circumvented by the alternative route.

9. A non-transitory computer readable medium comprising instructions for execution by a navigation apparatus, the instructions including a computer-implemented method for the navigation apparatus for displaying a guiding route on an image display apparatus, comprising:

determining, in a routing unit, the guiding route using route cost calculation;

sequentially acquiring, in a traffic event acquisition unit, a traffic event on a road;

controlling, in a traffic event display control unit, the image display apparatus so as to display a traffic event image representing a traffic event acquired by the traffic event acquisition unit near a road containing the traffic event on a map image in a first representation mode; and building, in a determination unit, a cost for a traffic event acquired by the traffic event acquisition unit into the route cost calculation and determining possibility of changing a guiding route based on a result of the route cost calculation, wherein the traffic event display control unit controls the image display apparatus based on an affirmative determination of the determination unit so as to display simultaneously on the map image: (i) a post-change guiding route, (ii) a pre-change guiding route, and (iii) a traffic event image corresponding to a traffic event on a pre-change guiding route causing the affirmative determination near a road containing the traffic event on the map image, in a second representation mode different from the first representation mode.

10. The non-transitory computer readable medium of claim 9, wherein the post-change guiding route and the pre-change guiding route are both signified when simultaneously displayed on the same map image.

11. A navigation apparatus for displaying a guiding route on an image display apparatus, the apparatus comprising:

a routing unit for determining the guiding route using route cost calculation;

a traffic event acquisition unit for sequentially acquiring a traffic event on a road;

a traffic event display control unit for controlling the image display apparatus so as to display a traffic event image representing a traffic event acquired by the traffic event acquisition unit near a road containing the traffic event on a map image; and a determination unit for building a cost for a traffic event acquired by the traffic event acquisition unit into the route cost calculation and determining whether or not to change a guiding route based on a result of the route cost calculation, wherein the routing unit performs a route cost calculation having a cost for a traffic event acquired by the traffic event acquisition unit to change the guiding route based on an affirmative determination of the determination unit, and wherein, when the traffic event image displayed by the traffic event display control unit exists on a guiding route before being changed by the routing unit and does not exist on a guiding route after being changed by the routing unit, the traffic event display control unit changes a representation mode of the traffic event image that is different from a current representation mode before changing the guiding route, and simultaneously displays the traffic event image together with a post-change guiding route.

12. The navigation apparatus of claim 11, wherein both (i) the post-change guiding route, and (ii) the traffic event image that existed on the guiding route before being changed and does not exist on the post-change guiding route, are simultaneously displayed on the same map image.

13. A non-transitory computer readable medium comprising instructions for execution by a navigation apparatus, the instructions including a computer-implemented method for the navigation apparatus for displaying a guiding route on an image display apparatus, comprising:

determining, in a routing unit, the guiding route using route cost calculation;

sequentially acquiring, in a traffic event acquisition unit, traffic event on a road;

controlling, in a traffic event display control unit, the image display apparatus so as to display a traffic event image representing a traffic event acquired by the traffic event acquisition unit near a road containing the traffic event on a map image; and building, in a determination unit, a cost for a traffic event acquired by the traffic event acquisition unit into the route cost calculation and determining whether or not to change a guiding route based on a result of the route cost calculation, wherein the routing unit performs a route cost calculation having a cost for a traffic event acquired by the traffic event acquisition unit to change the guiding route based on an affirmative determination of the determination unit, and wherein, when the traffic event image displayed by the traffic event display control unit exists on a guiding route before being changed by the routing unit and does not exist on a guiding route after being changed by the routing unit, the traffic event display control unit changes a representation mode of the traffic event image that is different from a current representation mode before changing the guiding route, and simultaneously displays the traffic event image together with a post-change guiding route.

14. The non-transitory computer readable medium of claim 13, wherein both (i) the post-change guiding route, and (ii) the traffic event image that existed on the guiding route before being changed and does not exist on the post-change guiding route, are simultaneously displayed on the same map image.

15. A navigation apparatus for displaying a guiding route on an image display apparatus, the apparatus comprising:

a routing unit for determining the guiding route using route cost calculation;

a traffic event acquisition unit for sequentially acquiring a traffic event on a road;

a traffic event display control unit for controlling the image display apparatus so as to display a traffic event image representing a traffic event acquired by the traffic event acquisition unit near a road containing the traffic event on a map image in a normal representation mode assigned to the traffic event image; and a determination unit for building a cost for a traffic event acquired by the traffic event acquisition unit into the route cost calculation and determining possibility of changing a guiding route based on a result of the route cost calculation, wherein the traffic event display control unit controls the image display apparatus based on an affirmative determination of the determination unit so as to display simultaneously on the map image: (i) a post-change guiding route, (ii) a pre-change guiding route, and (iii) a traffic event image corresponding to a traffic event on a pre-change guiding route causing the affirmative determination near a road containing the traffic event on the map image, in a first another representation mode of the traffic event image different from the normal representation mode assigned to the traffic event image, wherein the traffic event display control unit controls the image display apparatus to display an image for highlighting an alternative route to substitute the guiding route and a traffic event image corresponding to a traffic event existing on the guiding route and to hide a traffic event image corresponding to a traffic event existing elsewhere than the guiding route.

16. The navigation apparatus of claim 15, wherein
the post-change guiding route and the pre-change guiding route are both signified when simultaneously displayed on the same map image.

* * * * *